US009116675B2

(12) United States Patent
Bhattacharjee et al.

(10) Patent No.: US 9,116,675 B2
(45) Date of Patent: Aug. 25, 2015

(54) SYSTEM AND METHOD TO IDENTIFY A MEDIAN VALUE

(75) Inventors: Debotosh Bhattacharjee, Kolkata (IN); Santanu Halder, West Bengal (IN)

(73) Assignee: JADAVPUR UNIVERSITY, West Bengal, Kolkata (IN)

( * ) Notice: Subject to any disclaimer, the term of this patent is extended or adjusted under 35 U.S.C. 154(b) by 1095 days.

(21) Appl. No.: 12/646,681

(22) Filed: Dec. 23, 2009

(65) Prior Publication Data

US 2011/0099215 A1    Apr. 28, 2011

(30) Foreign Application Priority Data

Oct. 26, 2009    (IN) .......................... 1274/KOL/2009

(51) Int. Cl.
*G06F 7/00*    (2006.01)
*G06F 15/00*    (2006.01)
*G06F 17/10*    (2006.01)
*G06K 9/40*    (2006.01)
*G06F 7/22*    (2006.01)
*G06T 5/00*    (2006.01)
*G06T 5/20*    (2006.01)

(52) U.S. Cl.
CPC . *G06F 7/22* (2013.01); *G06T 5/002* (2013.01); *G06T 5/20* (2013.01); *G06T 2200/28* (2013.01); *G06T 2207/20032* (2013.01)

(58) Field of Classification Search
USPC .......................... 708/200–230, 304; 382/262
See application file for complete search history.

(56) References Cited

U.S. PATENT DOCUMENTS

| 4,135,248 | A | * | 1/1979 | Bluzer ............................ 702/190 |
| 4,334,223 | A | * | 6/1982 | Katagi .......................... 342/26 R |
| 4,513,440 | A | * | 4/1985 | Delman ......................... 382/262 |
| 4,802,108 | A | * | 1/1989 | Bagdis et al. ................. 708/202 |
| 5,144,568 | A | * | 9/1992 | Glover .......................... 708/202 |
| 5,408,675 | A | * | 4/1995 | Florentino et al. ............ 715/800 |
| 5,900,006 | A | * | 5/1999 | Yoon ............................. 708/202 |
| 6,078,213 | A | | 6/2000 | Huang |
| 6,199,084 | B1 | * | 3/2001 | Wiseman ...................... 708/304 |
| 6,831,453 | B2 | * | 12/2004 | Johnstone et al. ............ 324/102 |
| 7,003,535 | B1 | * | 2/2006 | Kelley et al. ................. 708/202 |
| 7,219,111 | B2 | * | 5/2007 | Saitou et al. ................. 708/202 |
| 2002/0073126 | A1 | * | 6/2002 | Kim ............................. 708/207 |
| 2003/0033336 | A1 | | 2/2003 | Gremmert |

(Continued)

OTHER PUBLICATIONS

Vijayarenu, Chandrasekar et al., "Design and Analysis of Algorithms Part II—Median & Runtime Analysis" (Jan. 30, 2008). University of Texas at Arlington. Accessed from <ranger.uta.edu/~chqding/cse5311/Lectures/QuicksortMedian.pdf> on Jan. 22, 2015.*

(Continued)

*Primary Examiner* — Idriss N Alrobaye
*Assistant Examiner* — Henry Yu
(74) *Attorney, Agent, or Firm* — Brundidge & Stanger, P.C.

(57) ABSTRACT

A system and method for determining a median value in a set of values in a digital processing circuit is provided. The method comprises the following steps—(a) for each value in the set, comparing the value to each other value in the set, (b) for each comparison, assigning an index based upon the comparison and (c) repeating steps (a) and (b) for each value in the set. The method further comprises (d) performing an arithmetic operation based upon the indices for each value, (e) comparing the result of step (d) with a threshold and (f) selecting the median value based upon the comparison performed in step (e).

11 Claims, 6 Drawing Sheets

(56) References Cited

U.S. PATENT DOCUMENTS

| | | | |
|---|---|---|---|
| 2006/0110063 A1* | 5/2006 | Weiss | 382/262 |
| 2010/0033336 A1* | 2/2010 | Jones | 340/632 |
| 2010/0161695 A1* | 6/2010 | Standfield et al. | 708/202 |

OTHER PUBLICATIONS

Maheshwari, R., et al., "FPGA Implementation of Median Filter," Proceedings of the Tenth International Conference on VLSI Design: VLSI in Multimedia Applications, 1997, pp. 523-524.

Karaman, M., et al., "Design and Implementation of a General Purpose VLSI Median Filter Unit and its Applications," International Conference on Acoustics, Speech, and Signal Processing, 1989, pp. 2548-2551.

Perry, D.L., "VHDL Programming by Example," Fourth Edition, Tata McGraw-Hill Edition, Copyright 2002 by the Tata McGraw-Hill Companies, Inc., pp. 1-497.

Weiss, B., "Fast Median and Bilateral Filtering," ACM Transactions on Graphics (TOG), Proceedings of ACM SIGGRAPH, 2006, vol. 25, No. 3, pp. 519-526.

Jiang, M., et al., "High-Performance 3D Median Filter Architecture for Medical Image Despeckling," Electronics Letters, Nov. 23, 2006, vol. 42, Issue 24, pp. 1379-1380.

Swenson, R.L., et al., "A Hardware FPGA Implementation of a 2-D Median Filter Using a Novel Rank Adjustment Technique," Seventh International Conference on Image Processing and its Applications, (Conf. Publ. No. 465), Jul. 1999, vol. 1, pp. 103-106.

Scott, J., et. al., "Comparison of 2D Median Filter Hardware Implementations for Real-Time Stereo Video," AIPR '08. 37th IEEE Applied Imagery Pattern Recognition Workshop, 2008, pp. 1-6.

Vega-Rodríguez, M., et al., "An FPGA-Based Implementation for Median Filter Meeting the Real-Time Requirements of Automated Visual Inspection Systems," Proceedings of the 10th Mediterranean Conference on Control and Automation—MED 2002, Lisbon, Portugal, Jul. 9-12, 2002, pp. 1-7.

International Search Report and Written Opinion for International Application No. PCT/IB2010/002652, ISA/AU, mailed on Mar. 11, 2011.

* cited by examiner

SYSTEM AND METHOD TO IDENTIFY A MEDIAN VALUE

CROSS REFERENCE TO RELATED APPLICATIONS

This application claims priority under 35 U.S.C. §119(a) to Indian Patent Application Serial No. 1274/KOL/2009 filed Oct. 26, 2009, the contents of which are incorporated by reference herein in its entirety.

BACKGROUND

In many applications, such as image processing applications, it is often required to perform several preprocessing algorithms to an image prior to applying high level processing algorithms such as edge detection and feature detection. The preprocessing steps usually include filtering or noise reduction, to suitably condition the image for more complex processing algorithms. One such preprocessing step is a medial filtering.

Median filtering is a common digital filtering technique applied to an image to reduce various signal noise such as speckle noise and salt and pepper noise to condition the image for further processing. Image processing applications usually implement median filtering algorithms because of their capability to preserve edges of the image.

Typically, a median filtering algorithm computes a median value from a set of values. In order to select a median value from a set of values, a sorting algorithm is first applied to sort the set of values into an ascending or a descending order. The median value is then selected as the value that is positioned in the middle of the set.

However, it has been generally observed that the median filtering algorithm as described above is often time consuming and thus reduces the speed of a processor implementing the algorithm. The time taken for sorting a data set is directly proportional to the size of the set. Hence, it is usually seen that in order to determine a media value from a large set of values, the time taken to do the computation increases substantially.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, according to one embodiment of the present technique, a method for determining a median value in a set of values in a digital processing circuit is provided. The method comprises the following steps—(a) for each value in the set, comparing the value to each other value in the set, (b) for each comparison, assigning an index based upon the comparison and (c) repeating steps (a) and (b) for each value in the set. The method further comprises (d) performing an arithmetic operation based upon the indices for each value, (e) comparing the result of step (d) with a threshold and (f) selecting the median value based upon the comparison performed in step (e).

In another embodiment, a system for determining a median value is provided. The system comprises a memory circuit for storing a set of values and processing circuitry. Processing circuitry includes a comparator module configured to (a) for each value in the set, comparing the value to each other value in the set, (b) for each comparison, assigning an index based upon the comparison and (c) repeating steps (a) and (b) for each value of the set. Processing circuitry further includes a counter module configured to perform an arithmetic operation based upon the indices for each value and compare a result of the arithmetic operation with a threshold and a multiplexer configured to select the median value based upon the comparison performed by the counter.

In another embodiment, a method for determining a median value in a set of values in a digital processing circuit is provided. The method comprises (a) for each value in the set, comparing the value to each other value in the set and itself, (b) for each comparison, assigning an index of 1 if the value is less than or equal to the compared value, and an index value of 0 if the value is greater than the compared value, (c) repeating steps (a) and (b) for each value of the set, (d) performing an arithmetic operation based upon the indices for each value, (e) comparing the result of step (d) with a threshold and assigning a selection index of 1 if a result of the arithmetic operation exceeds the threshold and (f) selecting as the median value based upon the comparison performed in step (e).

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
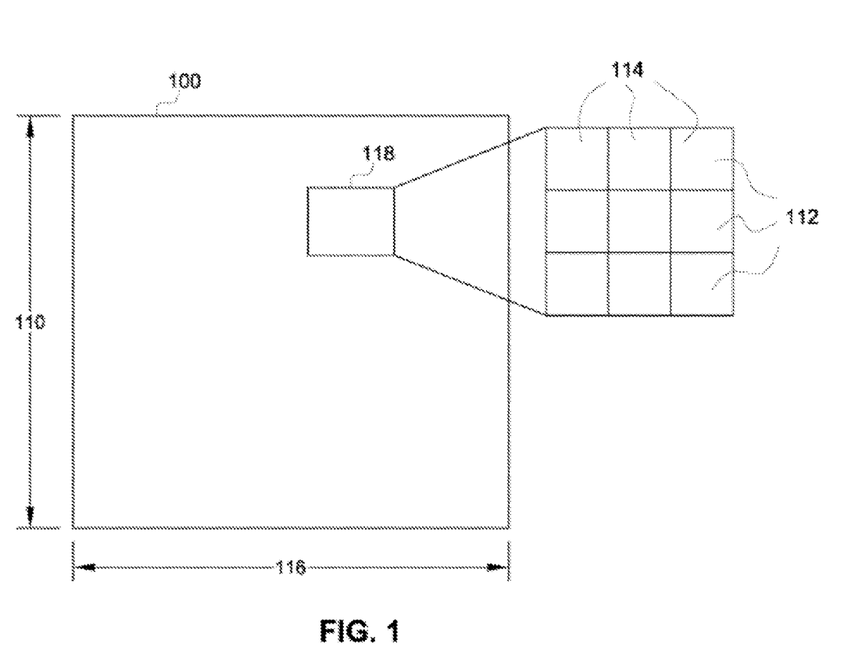
FIG. 1 is an illustrative embodiment of an image.

FIG. 1 illustrates an example discrete pixel image 100 produced via an imaging system (not shown). Image 100 is composed of a matrix of discrete pixels 118 disposed adjacent to one another in a series of rows and columns. In processing of image data, it may be useful to apply various filtering techniques that may consider two or more pixels in a row, column or area. For example, pixels in rows 112 and columns 114 may be filtered by determining a median value of the group, such as the 9 pixels in rows 112 and columns 114.

Over all, these rows and columns of pixels provide a pre-established matrix width 116 and matrix height 110. Typical matrix dimensions may include 256×256 pixels; 512×512 pixels; 1024×1024 pixels and so forth. The filtering techniques, including those that determine median values in a group of pixels, may be applied by moving the filter grouping around the matrix and considering different groups of pixels with each move.

Each pixel includes information that is representative of a portion of the imaged object. The information is present in the form of intensity values. The intensity value for each pixel has a dynamic range, typically characterized in terms of a binary number, such as of 8 bits, 16 bits, and so forth. By using the pixel information, an image of the object may be reconstructed using several image processing techniques.

Median filtering is a preprocessing step that is performed during image processing. The filtering technique includes finding a median value for a set of pixels with varying intensity values. The manner in which the median value is computed is described below.

Figure 2:
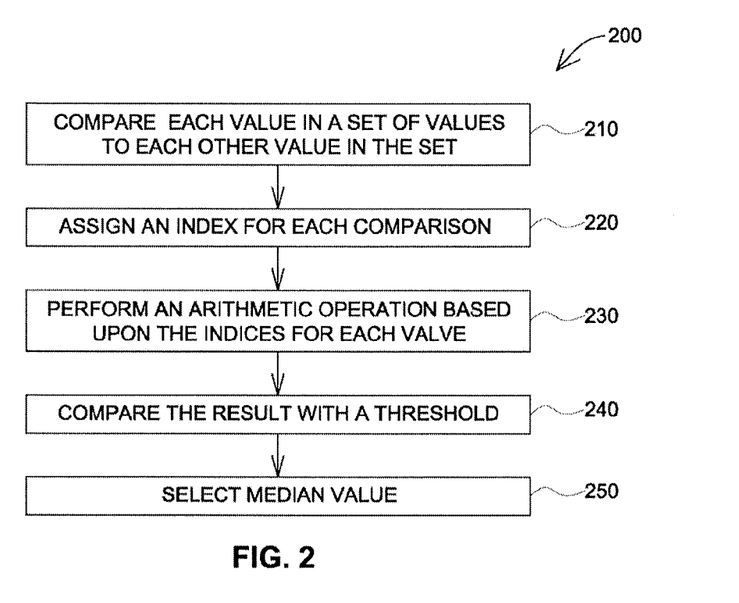
FIG. 2 is a flow chart illustrating one technique by which a median value is selected.

FIG. 2 is a flow chart illustrating one technique by which a median value is selected from a set of values. In one embodiment, the steps of the process described below are performed by a digital processing circuit. Each step in the process 200 is described in further detail below.

At step 210, each value in the set is compared to each other value in the set. As an example of values, in an image processing system, the set of values may be representative of intensity levels of the pixels in the image.

At step 220, an index is assigned for each comparison. In one embodiment, an index of 1 is assigned if the value is less than or equal to the compared value, and an index value of 0 is assigned if the value is greater than the compared value. In another embodiment, an index of 1 is assigned if the value is greater than or equal to the compared value and an index value of 0 if the value is lesser than the compared value. Steps 210 and 220 are repeated for all values of the set. At the end of step 220, each value in the set has been assigned a corresponding set of indices.

At step 230, an arithmetic operation is performed based on the indices for each value. In one embodiment, the arithmetic operation is an addition operation. At step 240, a result of the arithmetic operation is compared with a threshold. For example, if the arithmetic operation is an addition operation, then a sum of the indices for each value is compared to the threshold.

At step 250, the median value is selected based on a result of the arithmetic operation. In a specific embodiment, a selection index is assigned to each value and the selection index is compared to a selection threshold to identify the median value. The manner in which the median is selected is described in further detail below with reference to FIG. 3.

Figure 3:
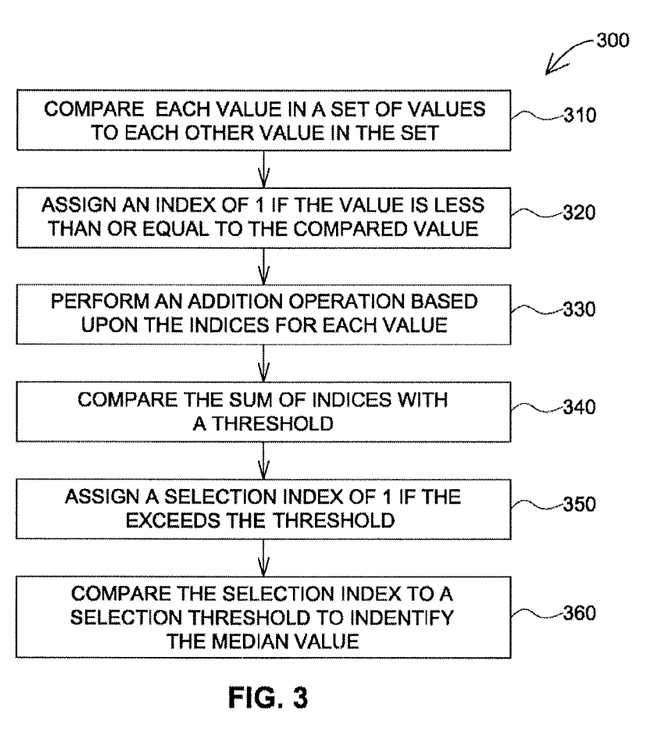
FIG. 3 is a flow chart illustrating a specific technique by which a median value is selected.

FIG. 3 is a flow chart illustrating a detailed technique for calculating a median value in a set of values. The steps of the process are performed in a digital processing circuit. Each step in the process 300 is described in further detail below.

In step 310, each value in the set is compared to each other value in the set and itself. For example, consider a set I with 9 values as shown below:

$I=\{I_2, I_3, I_4, I_5, I_6, I_7, I_8, I_9\}$

In step 310, $I_1$ is compared to each value in set I, that is, $I_1$ through $I_9$. The comparison includes a determination whether $I_1$ is less than or equal to all the values in set I.

At step 320, an index is assigned for each comparison for each value. For example, if $I_1$ is less than or equal to $I_2$, an index of 1 is assigned. If $I_1$ is greater than $I_2$, an index of 0 is assigned. Steps 310 and 320 are repeated for all values in set I. Thus at the end of step 320, each value has a corresponding set of indices, each index in the set representative of the result of the comparison.

At step 330, an arithmetic operation is performed on the indices for each value of the set. In one embodiment, the indices are added up to generate a count. Thus for each value in set I, a corresponding count is generated. For example, if for value $I_1$, the indices are represented by:

$R=\{1,0,0,1,1,1,0,1,0\}$

The count for $I_1$ is the sum of values in set $R_1$ which is 5 in the above example.

At step 340, the count for each value in set I is compared to a threshold. In an embodiment, where the arithmetic operation is an addition operation, the threshold is defined by a number that is one less than one half of the number of values in the set. For example, the threshold for set I is 4, since set I has 9 values.

At step 350, a selection index of 1 is assigned to the corresponding value if a result of the arithmetic operation exceeds the threshold and an index of 0 is assigned otherwise. For example, since $R_1$ is greater than 4 in the above example, a selection index of 1 is assigned for $I_1$.

At step 360, the median value is selected based upon the comparison performed in step 350. In one embodiment, the selected median value is the corresponding value for which the result of the arithmetic operation exceeds the threshold. In the above example, since $I_1$ has a selection index of 1, $I_1$ is selected as a median value.

In a another embodiment, a selection index is assigned to each value in set I, depending upon whether a sum of indices exceeds the threshold and then the selection index is compared to a selection threshold for identification of the median value. The manner in which above described techniques are implemented using hardware is described in further detail below.

Figure 4:
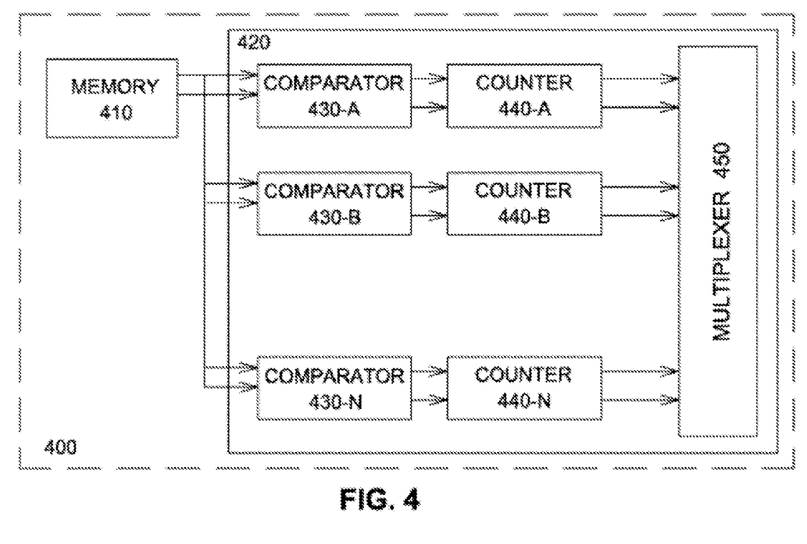
FIG. 4 is a block diagram of an embodiment of a digital system configured to select a median value from a set of values; according to aspects of an example technique.

FIG. 4 is a block diagram of one embodiment of a digital system for selecting a median value from a set of values. The digital system 400 includes a memory circuit 410, processing circuitry 420. Each block is described in further detail below.

Memory circuit 410 is configured to store a set of values. The set of values may correspond to a variety of information. For example, the set of values may be representative of intensity levels of each pixel in a discrete pixel image. The information stored in the memory is accessed by processing circuitry.

Processing circuitry 420 is configured to select a median value from a set of values. Processing circuitry comprises comparators 430-A to 430-N, counters 440-A to 440-N and multiplexer 450. In one embodiment, processing circuitry is configured to process image data, each value corresponding to picture element values for individual picture elements of an image.

Comparators 430-A through 430-N are configured to compare each value in the set of values to each other value in the set. Each value in the set is provided as an input to a corresponding comparator. In one embodiment, the value is also compared to itself apart from being compared to each other value in the set.

Upon comparison, an index is assigned to each value in the set. In one embodiment, the comparator is configured to assign an index of 1 if the value is less than or equal to the compared value, and an index value of 0 if the value is greater than the compared value. Thus, each value in the set has a corresponding set of indices.

Counter 440-A through 440-N are configured to perform an arithmetic operation based upon the set of indices corresponding to each value. In one embodiment, the arithmetic operation is an addition operation. The counter is further configured to compare a result of the arithmetic operation with a threshold.

In one embodiment, the threshold is defined by a number that equals one less than one half of the number of values in the set. The comparators are further configured to assign a selection index to each value, depending upon whether the sum of indices exceeds the threshold.

Multiplexer 450 is configured to select the median value based upon the comparison performed by the counter. The multiplexer is configured to compare the selection index to a selection threshold for identification of the median value. In one embodiment, the multiplexer is configured to select the value for which a selection index is 1. The above-described multiplexer may be implement in field programmable gate array (FPGA) systems as well and is described in further detail below.

Figure 5:
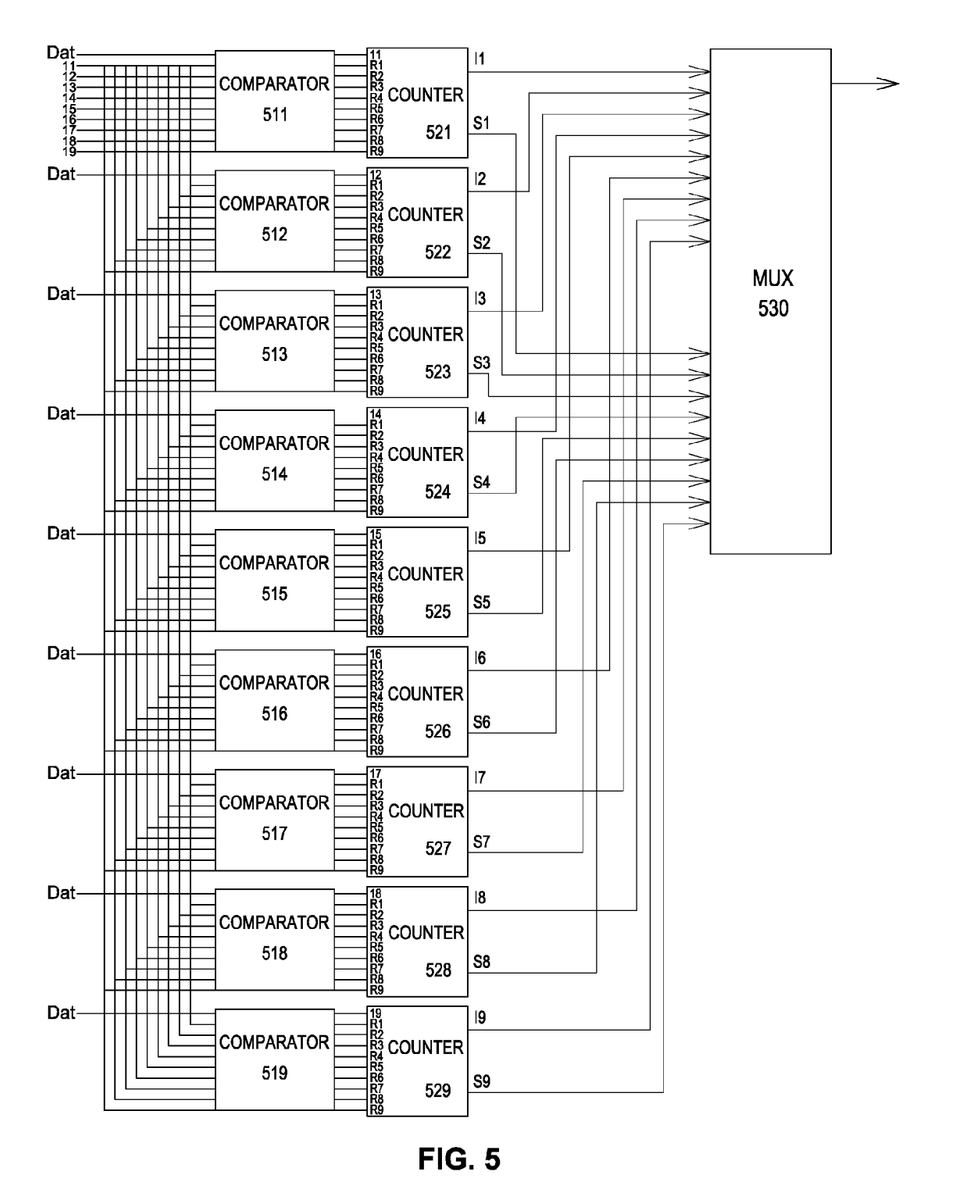
FIG. 5 is an illustrative embodiment of a field programmable gate array system configured to select a median value from a set of values; according to aspects of example embodiments.

FIG. 5 is a block diagram of one embodiment of a field programmable gate array (FPGA) system. The FPGA system 500 comprises among other circuit components (not shown), comparators 511-519, counters 521-529 and multiplexer 530. Each comparator 511-519 is configured to receive the data set and individual values as inputs. In the illustrated embodiment, individual values have been represented by $I_1$-$I_9$. The comparators are configured to generate an index value for each value in the set. Each index is represented by $R_1$-$R_9$.

Counters 521-529 are configured to perform an arithmetic operation on the index values generated by the corresponding comparators 511-519. Each counter 521-529 is configured to generate a selection index $S_1$-$S_9$ for corresponding values $I_1$-$I_9$. The selection index is representative of whether a sum of indices of a corresponding value exceeds a threshold.

The selection index $S_1$-$S_9$ and data values $I_1$-$I_9$ are provided to multiplexer 520. Multiplexer 520 generates the median value as the output. The median value is selected based on the selection index of each data value. In one embodiment, multiplexer 520 generates the data value for which the selection index is 1. The FPGA system as described above may be implemented in a variety of systems such as a computing device as described below.

Figure 6:
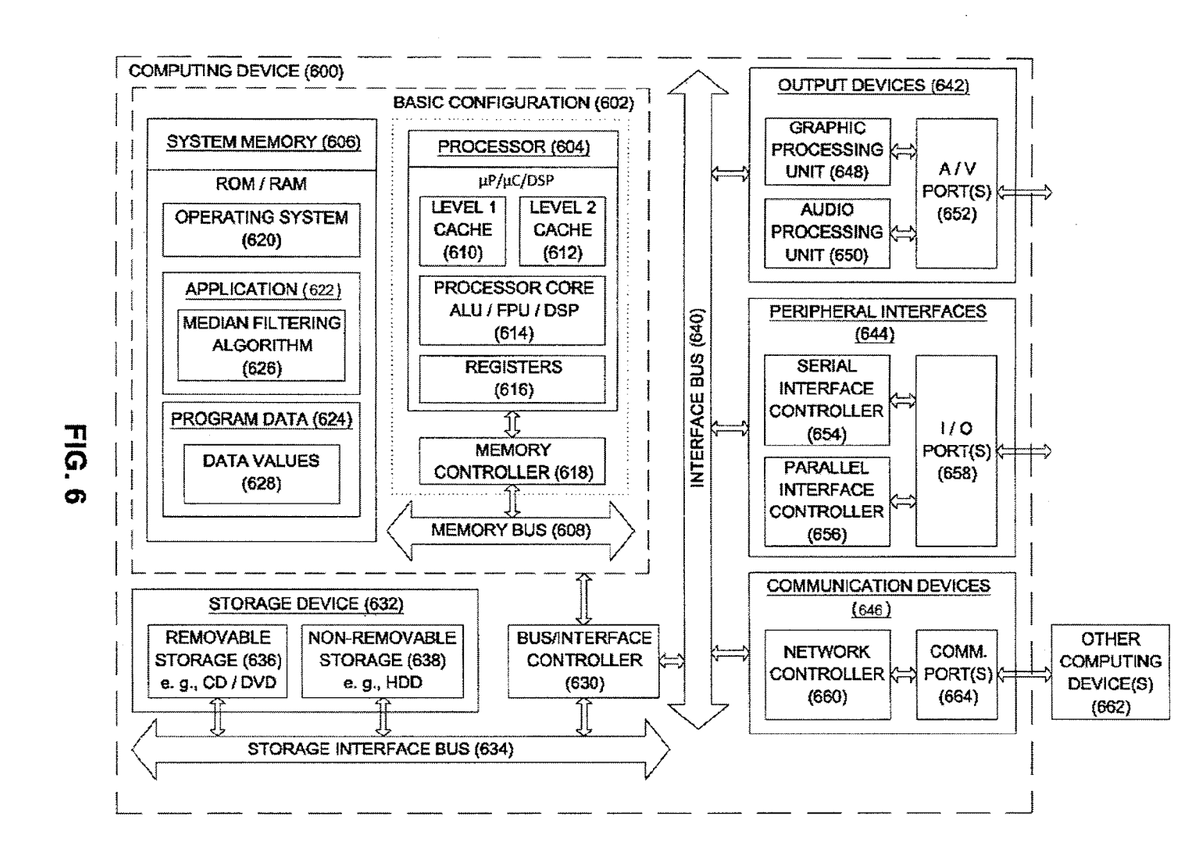
FIG. 6 is a block diagram of an embodiment of a digital processing circuit.

FIG. 6 is a block diagram illustrating an example computing device 600 that is arranged for generating a median value from a set of values in accordance with the present disclosure. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a median filtering algorithm 626 that is arranged to determine a median value in a set of values. Program data 624 may include data values 628 that may be useful for various applications such as image processing as is described herein. In some embodiments, application 622 may be arranged to operate with program data 624 on operating system 620 such that a median value is determined for a set of values. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, in a digital processing circuit, to determine a median value in a set of values, comprising:
   comparing a value in a set of values to an other value in the set of values;
   assigning a comparison index value based on a result of the comparing;
   storing the comparison index value in a set of comparison index values associated with the value;
   performing an arithmetic operation on the set of comparison index values associated with the value;
   comparing a result of the arithmetic operation with a threshold that comprises a number that is one less than one half of a number of values in the set of values; and
   selecting the value as a median value in response to the result exceeding the threshold.

2. The method of claim 1, wherein the assigning the comparison index value includes:
   assigning an index value of 1 in response to the value being less than or equal to the other value; and
   assigning an index value of 0 in response to the value being greater than the other value.

3. The method of claim 1, wherein the performing the arithmetic operation includes adding the comparison index values in the set of comparison index values associated with the value, and wherein the assigning the comparison index value includes:
   assigning an index of 1 in response to the value being less than or equal to the other value; and
   assigning an index of 0 in response to the value being greater than the other value.

4. A system to determine a median value in a set of values, comprising: a memory circuit configured to store a set of values; and
   processing circuitry coupled to the memory circuit and comprising:
   a comparator module, configured to compare a value in a set of values stored in the memory circuit to an other value in the set of values and assign a comparison index value, based on a result of the comparison,
   a storage unit, configured to store the comparison index value in a set of comparison index values associated with the value,
   a counter module, configured to perform an arithmetic operation on the set of comparison index values associated with the value and compare a result of the arithmetic operation with a threshold, wherein the threshold includes a number that equals one less than one half of a number of values in the set of values, and
   a multiplexer configured to select the value as a median value in response to the result being in excess of the threshold.

5. The system of claim 4, wherein to assign the comparison index value, the comparator module is configured to:
   assign an index value of 1 in response to the value being less than or equal to the other value; and
   assign an index value of 0 in response to the value being greater than the other value.

6. The system of claim 4, wherein the arithmetic operation includes addition of the comparison index values in the set of comparison index values associated with the value.

7. The system of claim 4, wherein the counter module is further configured to:
   assign a selection index to the value, depending upon whether a sum of the comparison index values in the set of comparison index values exceeds the threshold, and
   compare the selection index to a selection threshold to identify the median value.

8. The system of claim 4, wherein the processing circuitry is further configured to process image data, wherein the value corresponds to picture element values of individual picture elements of an image.

9. A method, in a digital processing circuit, to determine a median value in a set of values, comprising:
   comparing a value in a set of values to an other value in the set of values;
   assigning an index value of 1 in response to the value being less than or equal to the other value in a set of comparison index values associated with the value;
   assigning an index value of 0 in response to the value being greater than the other value in the set of comparison index values associated with the value;
   performing an arithmetic operation on the set of comparison index values associated with the value;
   comparing a result of the arithmetic operation with a threshold, wherein the threshold includes a number that is one less than one half of a number of values in the set of values;
   assigning a selection index of 1 in response to the result of the arithmetic operation exceeding the threshold; and
   selecting the value associated with the selection index of i as a median value.

10. The method of claim 9, wherein the performing the arithmetic operation includes adding the comparison index values in the set of comparison index values associated with the value.

11. The method of claim 9, wherein the digital processing circuit is adapted to Field programmable Gate Array (FPGA) systems.

* * * * *